United States Patent Office 3,251,657
Patented May 17, 1966

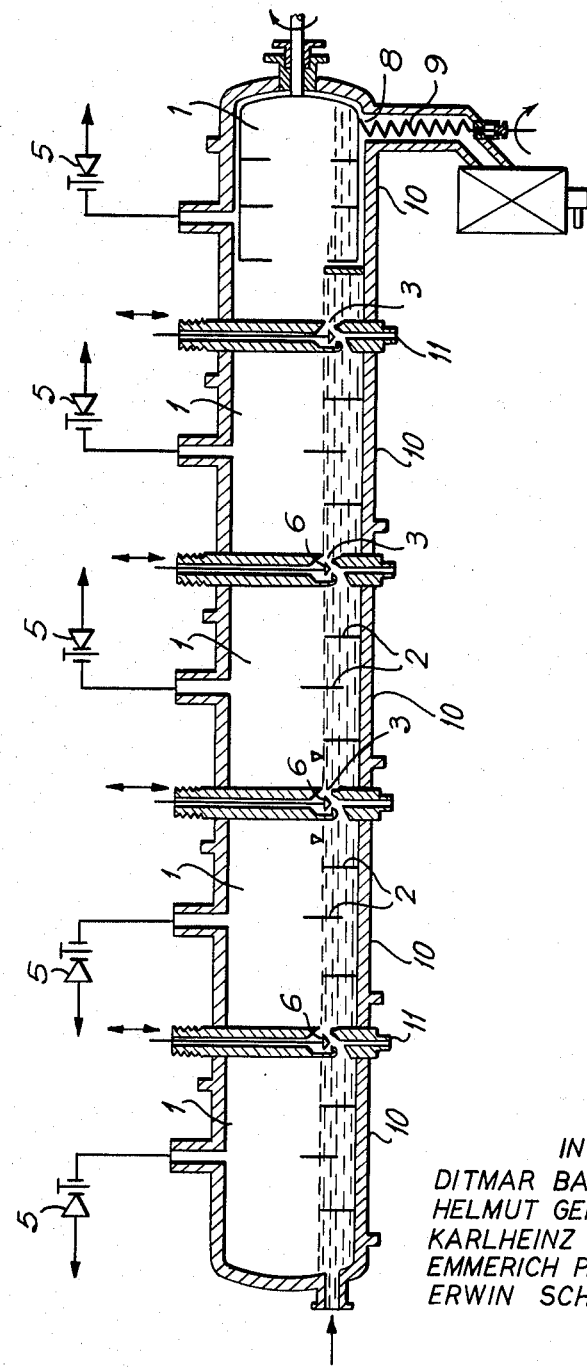

3,251,657
REACTOR FOR THE MANUFACTURE OF POLYETHYLENE PHTHALATES
Ditmar Bachmann, Hofheim, Taunus, and Helmut Gerstenberg, Karlheinz Grafen, Emmerich Paszthory, and Erwin Schrott, Frankfurt am Main, Germany, assignors to Farbwerke Hoechst Aktiengesellschaft vormals Meister Lucius & Bruning, Frankfurt am Main, Germany, a corporation of Germany
Filed May 9, 1963, Ser. No. 279,132
Claims priority, application Germany, May 11, 1962, F 36,779
20 Claims. (Cl. 23—285)

The present invention relates to a reactor for the continuous manufacture of pure or mixed esters of terephthalic acid and isophthalic acid, particularly polyethylene terephthalate and polyethylene isophthalate, from esters of terephthalic or isophthalic acid with lower alcohols, particularly methanol and ethylene glycol. These esters are referred to in the following as polyethylene phthalates.

The known processes for the continuous manufacture of polyethylene phthalates are carried out in several separate apparatus of which the first, a vessel provided with a stirrer or an apparatus similar to the known fractionating columns, serves for the re-esterificatiton. The second and the following apparatus serve for the polycondensation proper. For the first stage of the condensation, reactors provided with a stirrer or plate-type columns are used. For the next stage of the condensation, the so-called main condensation, film reactors are advantageously used in which the reaction mixture is distributed in thin layers. It has been proposed, for example, to carry out the main condensation in reactors constructed like film or falling film evaporators. It has also been proposed to use reactors in which the stream of liquid material is dammed up in steps by weirs.

The three process steps differ not only in the apparatus that are advantageously used but also in the physical conditions under which they are carried out, such as pressure and temperature, and particularly in the flow properties of the material put through.

The liquid mixture which is being reacted is conveyed from one apparatus to the next one through pipes by means of mechanically driven devices, such as gear pumps or diaphragm pumps.

The use of separate apparatus for each process step enables the individual apparatus to be well adapted to the respective process steps, but involves also great disadvantages. The large number of spots of packing in apparatus, pipes and conveying devices, particularly at the openings for the drives for the stirrers, scrapers and pump shafts, favor the access of air which alters the degree of whiteness of the product. Traces of air or oxygen result in products of inferior quality. This disadvantage of the known apparatus cannot even be overcome satisfactorily by thorough control of the process by the operator or by automatic devices. At best, the process can be interrupted prematurely.

Another disadvantage of such apparatus is that the control of the stream of material and the adjustment of the pressure and temperature to the course of the process is difficult to achieve in apparatus of such different type.

The present invention provides a reactor for the continuous manufacture of polyethylene phthalates from dimethyl phthalates and ethylene glycol, which enables the above disadvantages to be avoided. In accordance with the invention, the reactor comprises several chambers which are arranged side by side and can be heated separately. The chambers are provided with weirs. Each chamber communicates with the adjacent chamber through an adjustable opening disposed below the level of the overflow edge of the weirs. The gas chambers, i.e. the spaces above the liquid level in the individual chambers of the reactor, are each connected with a separate steam ejector or an adjustable stage of a common multistage steam ejector, so that the reactor can be operated with regulatable pressures graduated from the entrance to the outlet of the reactor.

In this reactor, all process steps from the re-esterification to the final condensation necessary for the manufacture of polyethylene phthalate can be carried out in one passage. No devices disposed outside the reactor are necessary for directly conveying the liquid mixture. The latter is conveyed from chamber to chamber through the openings in the partition walls between the chambers by the pressure difference between a chamber and the following one. The width of the openings can be easily adjusted in a manner such that the water is not dammed up too high or too low in the chambers. The number of the spots for packing is reduced to a minimum.

The steam of liquid material can be adjusted, for example by hand, according to the reading of an appropriate liquid level indicator so as to fill the chambers uniformly. In a particularly advantageous mode of constructing the reactor of the invention, the opening between two chambers is provided with a control member such as a slide valve, cone or screen which can be adjusted automatically, depending on the liquid level at the opening.

When the reactor is constructed according to the aforesaid mode, the flow of material from one chamber to the other is kept within narrow limits at a constant level which corresponds to the supply of material. The liquid level is maintained at the determined level and no gas can penetrate through the openings.

The control of the reactor may be supplemented in various ways by known methods. For example, the throughput or supply of material may be regulated depending on the desired final viscosity. The heating of the chambers may be adjusted automatically depending on the viscosity of the reaction mixture in the individual chambers, this measure being advantageous in many respects.

The pressure or pressure graduation in the reactor may be adjusted depending on the requirements of the final product. The polycondensation proper is advantageously carried out under a pressure below atmospheric pressure. The re-esterification may also be carried out at super-atmospheric pressure. It is therefore particularly advantageous that at least the steam ejector allotted to the first chamber after the reactor inlet, should be operated under super-atmospheric pressure.

It is also possible, however, to carry out the re-esterification in the first two chambers. In this case, only the first or both chambers may be operated at will at super-atmospheric pressure.

The required number of chambers or pressure stages depends on the quality of the product and the safe pressure graduation. With smaller pressure stages, that is a larger number of stages, the least danger of sublimation exists. It is generally sufficient to subdivide the reactor into seven chambers, this statement not being intended, however, to be an upper limit. A larger number of chambers may be used, unless this would be uneconomical. The reactor shall, however, have at least five chambers of which at least one, advantageously the last one before the reactor outlet, is provided with a stirring means.

A reactor for the manufacture of polyethylene phthalates constructed in accordance with the invention will now be described in more detail by way of example with reference to the accompanying drawing.

The reactor is subdivided into five chambers 1. Each chamber contains weirs 2, some of which are overflow weirs, while the rest are underflow weirs. The weirs promote mixing of the reaction mixture. Neighboring chambers intercommunicate only through openings 3, disposed below the level of the upper edges of the overflow weirs.

Openings 3 can be adjusted with the help of control member 6. Through the openings 3 the liquid flows from chamber to chamber. The vapors are drawn off by steam ejectors 5, or the like type device each chamber being provided with a separate steam ejector.

Control members 6 can be adjusted automatically depending on the reading of a liquid level indicator not shown in the drawing. When the liquid level rises, the said control members 6 enlarge the openings 3 and they close them when the liquid level drops below the upper edge of the overflow weirs.

The last one of chambers 1 is provided with a stirring device 7 which enables degrees of condensation to be obtained at which the fluidity is already considerably reduced. In a special mode of constructing the reactor of the invention (not shown in the drawing), further chambers may also be provided with stirrers, in which case the partition walls may serve as supports for sealed bearings. To facilitate the removal of such polycondensates of a higher degree of polycondensation it may be advantageous to dispose a screw 9 in outlet opening 8 as shown in the drawing. The weirs 2 in the last chamber may be wholly or partially dispensed with.

When the reactor is in a stationary state of operation, dimethyl phthalate and ethylene glycol flow into the first one of chambers 1 together with a re-esterification catalyst. By the pressure differential between the first and the second chamber, the re-esterified mixture is forced into the second chamber. The opening in the partition wall, which is adjusted by the control member, allows only such an amount of mixture to flow from the first into the second chamber that between the last weir 2 and the partition wall a liquid level is maintained which is sufficiently high to prevent the gas from flowing into the next chamber. The vapors that are formed in the first chamber, predominantly methanol, are drawn off by steam ejector 5. Supply, jacket heating 10 and pressure are adjusted in a manner such that the re-esterification is terminated when the mixture passes through the first opening 3. In the following chamber, the ethylene glycol in excess and any residual methanol are expelled. After the addition of a polycondensation catalyst, the polycondensation takes place in the following chambers. The polycondensation proceeds under pressures which are reduced from chamber to chamber and at temperatures which are increased from chamber to chamber. The highly viscous finished polycondensate is removed from the reactor through outlet 8 with the help of screw 9. The course of the process is continuously controlled by taking test samples at any desired place of the reactor, for example at the short pieces of pipe 11, and corrected, if necessary.

In addition to the above mentioned advantages as to arrangement, the reactor of the invention offers the further advantage that the polycondensation process which is known in itself can be effectively adjusted to any desired degree of polycondensation. The reactor of the invention can be constructed so as to require only a sliding packing which is easy to control. The operating rods for the control of openings 3 can easily be conducted through the walls with the help of bellows, without using packing boxes. The liquid level can be measured, without the necessity of providing wall entrances, by using known irradiation methods. The packings at the slip joints pose no problem. The danger of air penetrating into the apparatus is therefore much smaller than in the known apparatus.

Any apprehensions that the use of a single reactor might reduce the required range of variation of the individual process steps were completely groundless.

We claim:

1. A reactor for the continuous manufacture of polyethylene phthalates which comprises a plurality of reaction chambers for re-esterification and condensation of the reactants to form said polyethelene phthalates, said reaction chambers being on substantially the same level and contiguous with at least one other reaction chamber for establishing a continuous flow of the reaction mixture from a first charge chamber to a last discharge chamber, said reaction chambers further being gas-tight and separated by walls, inlet means connected to said charge chamber for charging reactants to said reactor, means in each reaction chamber above the reaction mixture level therein for removal of gaseous reaction products and for controlling the pressure within the reaction chamber, passageways in each wall to permit the reaction mixture in each chamber to flow into the next reaction chamber, valve means in each wall to regulate the rate of flow of the reaction mixture through said passageways, weir means in each reaction chamber to retain a volume of reaction mixture therein at a level above the level of the passageway in the wall separating said reaction chamber from the preceding reaction chamber to prevent the entry of gas from said preceding reaction chamber through said passageway, outlet means connected to said discharge chamber for removing the reaction mixture from the reactor, and means for heating each reaction chamber.

2. A reactor as defined in claim 1 having at least five reaction chambers.

3. A reactor as defined in claim 1 further comprising stirring means for at least one of said reaction chambers.

4. A reactor as defined in claim 3 wherein said stirring means is in said discharge chamber.

5. A reactor as defined in claim 1 wherein said discharge reaction chamber outlet means includes screw means for removing viscous products.

6. A reactor as defined in claim 1 wherein said discharge reaction chamber outlet means is in the base of said chamber and at the end opposite the wall separating said discharge chamber from the preceding reaction chamber.

7. A reactor as defined in claim 1 wherein said gas removal means are steam ejectors with control valve means to regulate the pressure within each reaction chamber to provide a decreasing pressure gradient throughout said reactor from said charge chamber to said discharge chamber.

8. A reactor as defined in claim 1 wherein said gas removal means includes a steam ejector, manifold means connecting said reaction chambers to said steam ejector, and control valve means in said manifold means to regulate the pressure within each reaction chamber to provide a decreasing pressure gradient throughout said reactor from said charge chamber to said discharge chamber.

9. A reactor as defined in claim 1 wherein said reactor is a horizontally disposed elongated substantially cylindrical vessel having spaced vertically disposed walls therein forming said reaction chambers.

10. A reactor as defined in claim 9 further comprising a jacket surrounding said vessel forming a heat exchange means around each reaction chamber for heating said chambers.

11. A reactor as defined in claim 1 further comprising baffle means within said reaction chambers for mixing the reaction mixtures therein.

12. A reactor as defined in claim 1 wherein said inlet means opens into said charge chamber below the level of the reaction mixture maintained therein.

13. A reactor as defined in claim 1 further comprising sample tap-off means in at least one of said walls for removing small portions of the reaction mixture flowing through the passageway in said wall.

14. A reactor as defined in claim 1 wherein said reactants are a lower alkyl phthalate and ethylene glycol, and said vapors consist essentially of lower alkanol.

15. A reactor as defined in claim 14 wherein said reactants are charged to said reactor in admixture with a catalyst.

16. A reactor for the continuous manufacture of polyethylene phthalates from a lower alkyl phthalate and ethylene glycol which comprises: an elongated substantially horizontal vessel having a plurality of walls therein forming reaction chambers in which reaction mixtures of the reactants in varying stages of re-esterification and polycondensation are maintained at predetermined levels; inlet means opening below the level of the reaction mixture in a charge chamber at one end of said vessel for charging the reactants to the reactor; outlet means opening below the level of the reaction mixture in a discharge chamber at the opposite end of said vessel for discharging the reaction mixture including polyethylene phthalate reaction product from the reactor, said outlet means including screw means for removal of said reaction mixture; passage means in said walls opening into the chambers formed thereby below the levels of the reaction mixtures therein to permit the flow of reaction mixture from each chamber into the next adjacent chamber toward the discharge chamber, said passage means including valve means to regulate the rate of flow of reaction mixture therethrough and sample tap-off means for removing small portions of the reaction mixture flowing therethrough; overflow weir means in each chamber to maintain the reaction mixture therein at said predetermined level; underflow weir means in each chamber to promote mixing of the reaction mixture therein; means opening into each chamber above the level of the reaction mixture therein for removal of gaseous reaction products, said removal means including pressure control means to regulate the pressure in each chamber and to establish a decreasing pressure gradient throughout said reactor from said charge chamber to said discharge chamber; agitator means in said discharge chamber; and heat exchange jacket means around said vessel for heating said chamber.

17. A reactor as defined in claim 16 having at least five reaction chambers.

18. A reactor as defined in claim 16 having from five to seven reaction chambers.

19. A reactor as defined in claim 16 wherein said gas removal means are steam ejectors with control valve means to regulate the pressure within each reaction chamber.

20. A reactor as defined in claim 16 wherein said gas removal means includes a steam ejector, a manifold connecting each reaction chamber to said steam ejector, and control valve means in said manifold to regulate the pressure within each reaction chamber.

References Cited by the Examiner
UNITED STATES PATENTS 2,768,987  10/1956  Hart _____ 23—285 X MORRIS O. WOLK, *Primary Examiner.*

JAMES H. TAYMAN, JR., *Examiner.*